Figure 1:
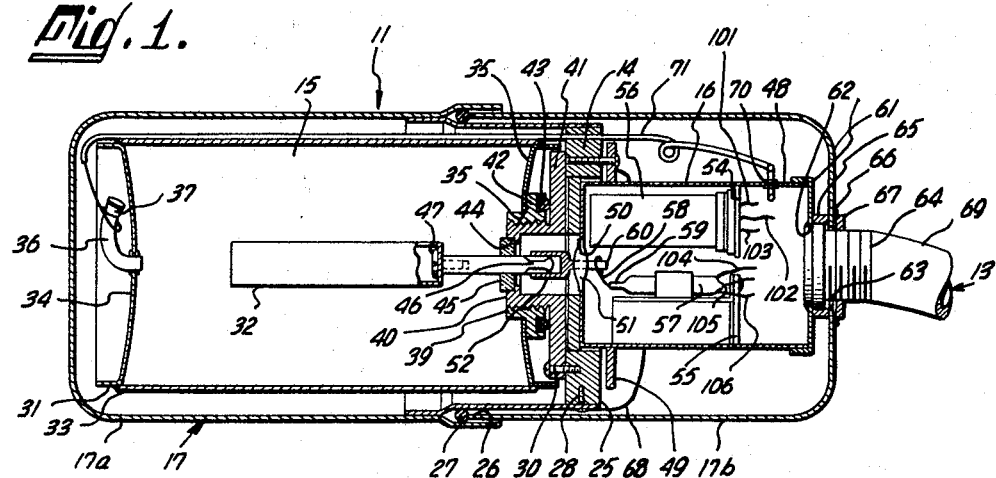

Aug. 8, 1961 R. E. WHITE 2,995,661
RADIATION METER WITH SHIELDED AMPLIFIER
Filed Jan. 2, 1958

INVENTOR.
RALPH E. WHITE
BY
ATTORNEYS.

2,995,661
RADIATION METER WITH SHIELDED AMPLIFIER
Ralph E. White, Altadena, Calif., assignor, by mesne assignments, to Nucleonics Corporation, Burbank, Calif., a corporation of California
Filed Jan. 2, 1958, Ser. No. 706,657
3 Claims. (Cl. 250—83.6)

This invention relates to radiation meters of the "floating grid" type, i.e. the negative electrode of an ionization chamber is connected to the control grid of an electrometer tube to provide a logarithmic indication of a wide range of intensity of radiation of the type produced by radioactive materials. More particularly, the invention relates to such a radiation meter in which the electrometer tube is closely associated with the ionization chamber, but is protected by a shielding container maintained at a relatively negative potential. In the preferred form of the invention, the ionization chamber container and the amplifier container are mounted in a common insulating structure, which is supported within a protective housing having a connection plug at the amplifier, so that a cable from remotely located meters, batteries, and calibration switch gear, can be connected directly into the amplifier container.

Wherever radioactive materials are used in research or industrial applications, radiation meters must be used both for control and safety. Radiation meters so employed may be referred to as industrial radiation meters in order to distinguish them from the many radiation detection devices used in prospecting for radioactive ores, or for special purposes for which only a narrow range of radiation intensity is to be measured. Among the important preferred characteristics of an industrial radiation meter are the following:

(1) An ability to directly indicate any radiation intensity between background radiation normally present and 100,000 roentgens per hour;

(2) Reasonably rapid response time so that an intensity may be indicated even if it endures only for a few seconds;

(3) Resistance to deterioration by exposure to high intensity radiation for several hours at a time;

(4) A minimum output of 10 millivolts so that recorders can be operated directly from the meter without secondary amplification; and (5) A constant sensitivity not substantially affected by electric field from power lines or the line in the vicinity of the meter.

Most Geiger counters, scintillation counting radiation detectors and the like may be classified as prospecting and research instruments rather than as industrial instruments since they generally fail in all five of the listed requirements. Prospecting instruments, including most previously known radiation meters, are linear reading instruments, that is the meter indication per unit is the same for the lowest intensity as for the maximum intensity which the meter is capable of detecting. Thus, the meter is capable of measuring radiation intensity only over a small portion of the maximum range which is preferred in industrial meters. The output signal from Geiger counters and scintillation counting radiation detectors is ordinarily a few microamperes, and amplifiers are needed in order to continuously record their outputs on standard types of recording instruments. Also, such instruments are adversely affected in most cases by either prolonged exposure to high intensity radiation or nearby power lines, or both.

In the instruments of the present invention, the output signal is not linear with respect to the radiation intensity detected, but is logarithmic; moreover, the output signal is strong enough to operate a 10 millivolt standard recorder without intermediate amplification.

The instrument of the present invention is of the so-called "floating grid" type. An ionization chamber is employed to detect the radiation, the negative electrode of the ionization chamber is connected directly to the control grid of an electrometer tube, and the two are sufficiently insulated electrically from all external influences so that they move freely up and down in potential as a unit without being appreciably affected by electrical fields in the vicinity, particularly any field associated with the plate circuit of the electrometer tube, or with the ionization chamber itself. Such a "floating grid" arrangement is capable of producing a very satisfactory logarithmic response to detected radiation, but no practical means has heretofore been known for closely coupling the electrometer tube grid to the negative electrode (or collector grid) of the ionization chamber. The electrometer tube must be physically closely associated with the ionization chamber electrode, since there is no practical way to transmit the changes in potential on the collector grid over a long conduit without disastrous loss in sensitivity and accuracy. Even the presence of minute amounts of moisture at any place in the "floating grid" system produces extremely adverse effects. If the electrometer tube is placed inside the ionization chamber, it tends to deteriorate under bombardment by particles inside the ionization chamber. In the past, however, such an arrangement was considered the only possible one for meters of the "floating grid" type.

In the present invention, the electrometer tube is housed in its own hermetically sealed container, and the container walls are maintained at a ground potential which is the common negative for all the different voltages supplied to the amplifier and ionization chamber assembly. The amplifier container thus functions to provide electrostatic shielding of the electrometer tube from capacitance effects which would otherwise distort or entirely suppress indication of radiation intensity. Thus, for example, the ionization chamber container may be maintained at a positive potential of 20 to 90 volts at a distance of less than one inch from the electrometer tube without influencing the tube's operation.

Although the "floating grid" type of operation requires that the electrometer tube be located very close to the ionization chamber, it is important that the electrometer tube be protected, at least in part, from the radiation to which the ionization tube is exposed for purposes of detection. It has been established that electrometer tubes subjected to radiation over a substantial period of time deteriorate to an unpredictable extent and at an unpredictable rate. The relatively negative electrostatic shielding of the electrometer tube of the amplifier container therefore serves a second important purpose, because it greatly reduces the collection of positively charged ions on the electrometer tube glass envelope.

In the preferred construction of the invention, the ionization chamber container and the amplifier container are mounted end-to-end on the same electrically insulating structure, with a small cavity provided in that structure for coupling the collector grid of the ionization chamber to the control grid of the electrometer tube, both of which have external connection means brought out of their respective containers through glass seals. This construction completely protects the floating grid system from moisture deposition, and gives a maximum protection against electrical field disturbances, since the electrical field in the vicinity is dominated by the constant positive 30-volt potential on the ionization chamber container, and the constant negative ground potential on the amplifier container.

Figure 2:
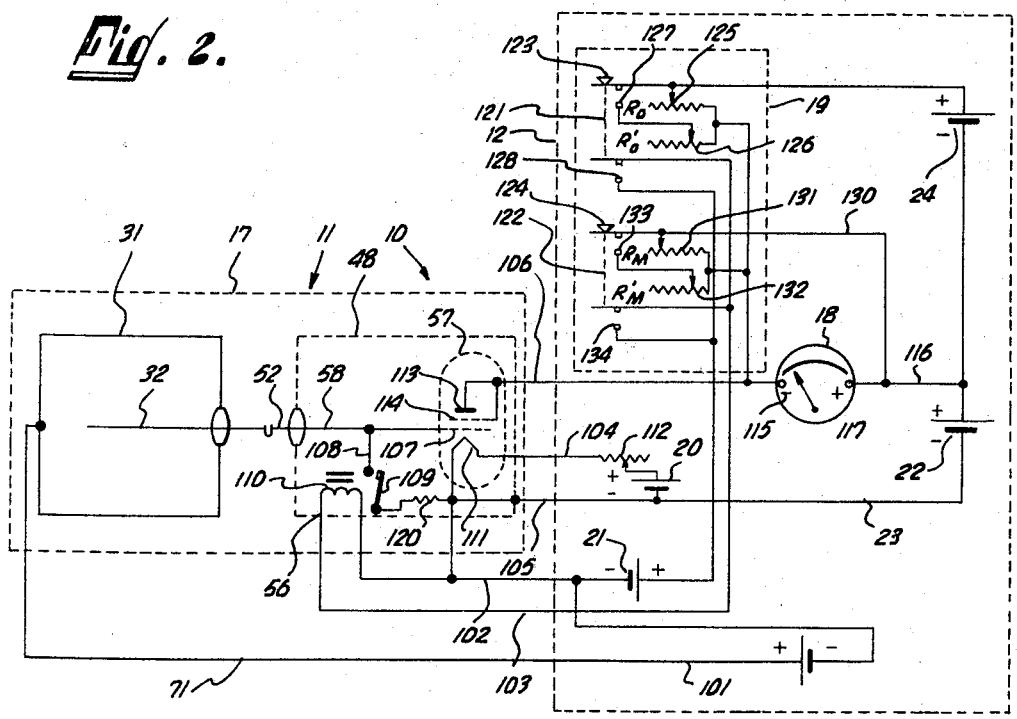

The foregoing and other aspects and advantages of the invention will best be understood from the following description of one specific embodiment, taken in connection with the accompanying drawings, in which:

FIGURE 1 is a longitudinal sectional view of the ionization chamber and the amplifier container, as mounted in their common protective housing; and FIGURE 2 is a simplified wiring diagram showing schematically the device of FIGURE 1 as connected to the necessary external power sources, direct current meter, and calibrating switches.

The radiation meter, taken as a whole, may be considered as comprised of a detection section, illustrated in FIGURE 1, and an indicating and power section, illustrated schematically as part of FIGURE 2. The invention resides in the detection section and in the combination of the entire system. The meter, power sources, switches, and potentiometers in the indicating and power section are standard components and may be of any type suited to the specifications of the instrument.

In FIGURES 1 and 2, the radiation meter as a whole is indicated by the numeral 10, the detection section by the numeral 11, the indication and power section by the numeral 12, and the connecting cable by the numeral 13. In the detection section 11, the principal parts are a central insulating structure indicated generally by the numeral 14, an ionization chamber 15, an amplifier 16, and a housing 17. The indication and power section 12 is seen to contain principally the indicating meter 18, a calibration system 19, and power sources for four different voltages, indicated in FIGURE 2 as batteries 20, 21, and 22 connected to a common ground 23, and a bucking voltage battery 24.

In FIGURE 1, the sectional view of the detection section 11 reveals that the housing 17 is comprised of two de-mountable parts, an ionization chamber housing 17a, and an amplifier housing 17b, both of which are cylindrical shells, and are adapted to fit tightly together. Preferably, the amplifier housing 17b functions as a cap which slides over the open end 25 of the ionization chamber housing 17a, being received in an annular recess 26, and seating in sealing engagement with an O-ring 27. The housing is generally constructed of aluminum. Metal is definitely preferred for the housing since it can be connected to the negative ground and thus can provide an enclosing wall at a single standard potential.

The insulating ring structure 14 is mounted in the open end 25 of the ionization chamber housing section 17a, being fastened in place by three or four radial screws, one of which, screw 28 is seen in the sectional view of FIGURE 1. The insulating structure 14 is ordinarily a linen base phenolic ring to one side of which the amplifier 16 is attached by three or four screws 29, and to the other side of which the ionization chamber is attached by means of three or four screws 30.

The ionization chamber 15 is comprised principally of a cylindrical steel container 31, which functions as the positive electrode of the ionization chamber, and a collector grid 32, disposed along the axis of the container 31, and which functions as the negative electrode of the ionization chamber 15.

The chamber is filled with argon at 150 pounds per square inch pressure in order to increase chamber efficiency. Since ionization current for a given radiation is directly proportional to the mass of gas present, higher output current is thus obtained. The larger mass of gas present also results in a lower temperature coefficient, since the percentage of contaminate molecules remaining in the chamber after baking and evacuation is smaller. It is therefore a preferred form of the invention to employ an inert gas at a substantially super-atmospheric pressure in order to achieve the outputs necessary to produce a system capable of responding logarithmically over a wide range. Also, the steel chamber wall increases the gamma and X-ray efficiency by producing more secondary, or Compton electrons than an air equivalent chamber wall. Another preferred feature shown is an enclosing shell 33 of .015 inch lead sheet to provide an energy-absorption shield for the chamber.

The ends 34 and 35 of the chamber may suitably be of concave, pressure-resisting construction, preferably silver soldered in place to assure the maximum strength of construction.

A vacuum and fill tube 36 is shown at the unsupported end of the ionization chamber container 31, its end 37 having been sealed off at the time of manufacture of the chamber 15.

At the support end of the ionization chamber, adjacent the insulating ring 14, the end wall 35 is provided with a central opening 38 into which an internally threaded metal insert 39 is soldered. Insert 39, in turn, receives an externally threaded sleeve member 40 which is provided with a large disc-shaped flange base 41, by means of which the ionization chamber 15 is screwed to the insulation ring 14 by screws 30. The outer face of the ring 39 is provided with an annular recess 42 which houses an O-ring pressure seal 43, the opposite surface of which seats against the adjacent surface of the disc flange 41. A central opening 44 in the sleeve 40 carries a glass pressure seal 45 in which the collector grid 32 is supported, the external end of the grid 32 terminating in a male connection member 46. In the construction shown, the grid 32 is attached to male connection 46 by means of a screw 47.

The amplifier is housed in an amplifier container 48, which is a hermetically sealed metal can provided with a base flange 49 by means of which the amplifier 16 is mounted on insulating ring 14 by means of screws 29. The base end of amplifier container 48 has a central opening 50 in which a glass bead seal 51 supports an externally projecting female member 52 which is positioned to receive the male connection 46 of the collector grid 32 of the ionization chamber 15. The adjacent surfaces of the disc flange 41 and the bottom of the amplifier container 48 compressively engage a flat ring gasket 53, which is preferably made of carbon-free neoprene, or some other resilient insulating material.

It will be seen that the amplifier container 48 and the flange 41 can be tightened into sealing contact against the neoprene gasket 53 without damage to the glass seals 45 and 51, since the ionization chamber male member 46 and the amplifier container female member 52 make a sliding electrical contact permitting adjustment in the direction of tightening.

The interior of the amplifier container 48 is provided with a pair of brackets 54 and 55 upon which are supported a relay 56 and an electrometer tube 57, respectively. A grid lead 58 leads from the grid terminal 59 of the electrometer tube 57 to the inner end 60 of male member 52.

The conduit end 61 of the container 48 has a central opening 62 adjacent a central opening 63 in the end of amplifier housing section 17b, to provide an exit for conduits 101, 102, 103, 105, and 106, the functions of which will be described hereinafter in connection with the wiring diagram of FIGURE 2.

Preferably, connection to connector cable 13 is made through an AN connector 64, which is mounted in the opening 63. A tight seal is provided by an internal gasket ring 65, an external gasket ring 66, and a lock nut 67.

Leads 102 and 105 are both negative ground potential leads connected to the external shielding sheath of cable 13, and serving as the negative terminal for the filament and plate circuits of the electrometer tube 57, and the relay circuit of relay 56. Also, these leads are connected to the metal structure of the amplifier container 48 to maintain it at negative ground potential. A jumper wire 68 is provided between amplifier fastening screw 29 and the screw 28 in order to maintain the housing 17, including both ionization chamber housing section 17a and amplifier housing 17b at the same negative ground potential as the amplifier container 48 and the shielding sheath 69 of the cable 13.

Lead 101 introduces a 30-volt positive potential for ionization chamber container 31, electrically conductive connection being made through a glass seal 70 in the wall of the amplifier container 48 and an insulated wire 71 which is connected at its terminating end to vacuum and fill tube 36.

In FIGURE 2, the grid lead 58 leading from the female connection member 52 of the amplifier 16 is seen to be connected directly to the control grid 107 of the electrometer tube 57. At the same time, it will be noted, that there is no other electrical connection whatever to the system comprised of the ionization collector grid 32 and the electrometer tube control grid 107. This is the arrangement known as the "floating grid" type of radiation detection device.

The floating character of the grid system 32—107 can be terminated temporarily for purposes of calibration by closing the terminals 108 and 109 of the relay 56, this being accomplished by exciting the relay coil 110 with current from relay battery 21 (usually 10 volts) introduced by way of conduits 102 and 103. Switching is carried out in the calibration section 19, the elements of which will be described in detail hereinafter.

The filament 111 of the electrometer tube 57 is heated by current from battery 20 (usually 1 volt) which is connected to the filament 111 by means of a negative ground conductor 105, which may be the same as conductor 102, and a positive conductor 104. Preferably, filament heating current is controlled by variable resistance 112.

The plate 113 of the electrometer tube 57, together with its associated grid 114, is connected by means of lead 106 to the negative terminal 115 of the meter 18. The plate circuit is completed by lead 116 from the positive terminal 117 of the meter 18, the plate battery 22, and the ground line 23, which leads into ground wire 105 connected to the filament 111.

The system thus far described, excluding the calibratoin relay 56 and the calibration section 19, comprehends all of the working circuit of the radiation meter, which is employed during its ordinary operation. Although various electrometer tubes may be used, a preferred choice is a tube such as the CK-5886 operating at 5 volts plus for plate. The system as described will be found to produce a very practical logarithmic response to be read upon a logarithmic calibrated scale on the meter 18. However, it will be appreciated that a less logarithmic and more linear reading may be achieved by inserting a high megaohm resistor between the floating grid system 32—107 and negative ground potential in the same position as grounding resistor 120. For example, such a resistor might be inserted permanently between the line 108 and ground, and a relay, such as calibration relay 56, used to simulate the linear characteristics of the radiation meter 10 as desired. A series of such resistors and relays could be employed to give the radiation meter 10 a series of linear reading ranges.

The calibration section 19 is first used in conjunction with a calibrated gamma source and a calibrated scale.

Within the calibration section 19, there are two pushbutton systems, indicated generally by the numerals 121 and 122, and operated by push buttons 123 and 124, respectively. The two push-button systems 121 and 122 will suffice to establish two points on the meter scale 118. It will be understood that in an actual meter, more than two such push-button systems would be provided. However, two systems will suffice to illustrate the present specific embodiment.

In the presence of very low or background radiation, the variable resistor 125, through which bucking current from bucking battery 24 passes around the meter, is adjusted to produce the desired low or zero reading on the scale 118. The resistor 125 is, therefore, designated $R_0$.

For purposes for subsequent testing of the meter 10, it is next necessary to adjust the resistor 126, designated as $R'_0$, to a value which can be used to make the meter 18 simulate a radiation reading corresponding to the setting of $R_0$. This is done by depressing the calibration button 123. Two switches 127 and 128 are thus closed, the first switch 127 placing the resistor $R'_0$ in the circuit of bucking battery 24, and the second switch 128 simultaneously operating the relay 109 to bias the grid system 32—107 to ground through the resistor 120. At the time of initial calibration, $R'_0$ is then adjusted so that the meter reads the same as if the detection section 17 were exposed to the radiation corresponding to the setting of $R_0$. During subsequent use, if there is any question about the operation of the amplifier and meter system, the button 123 can be depressed to see if the proper reading is indicated on scale 118. If it is not, then it will be evident that either something is defective in the meter 10, or some new calibration is required.

A maximum point on the meter scale 118 may be set by adjusting the shunt resistance $R_M$, which is located in the shunt circuit line 130, until the proper reading appears on the scale 118 in the presence of the calibrated radiation source. Next, a variable checking resistor $R_M'$, designated by the numeral 132, is adjusted in the same mannner and for the same purposes as $R'_0$. The push button 124 is depressed to close the switches 133 and 134. The closure of switch 133 places the resistor $R_M'$ in the shunt circuit 130, and the closure of the switch 134 closes relay 109 so as to place the grid system 32—107 in a neutral non-indicating position by biasing it to ground through the grounding resistor 120. Thus, again, if at any subsequent time it is desired to check the reading of the point on scale 118 corresponding to the original maximum exposure, at the time of setting of $R_M$, this may be done by depressing the button 124 to see if the desired maximum reading appears on scale 118.

In a typical embodiment of the invention as described, the ionization chamber may be a stainless steel can three inches in diameter, and the electrometer tube may be CK-5886. Suitable voltages for the five incoming lines would then be as follows:

Line:
- 105_____ Negative ground potential.
- 104_____ .9 to 1.25 volts for filament heating current.
- 106_____ Plate voltage of 5.4 volts.
- 101_____ Ionization chamber container, voltage of 30 volts.
- 103_____ A relay voltage of 10 volts.
- 102_____ The same ground voltage as line 105.

It will be understood that the container potential at which it is desirable to maintain the ionization chamber container 31 will depend upon the diameter of the chamber, principally. Thirty volts has been found to be a suitable positive potential for a 3 inch container. However, a positive potential of between 20 to 90 volts has been found to be the preferred range for all ionization chamber containers of 3 inches, in the present combination.

Examples of other suitable signs and voltages are as follows:

| Diameter, inches: | Suitable positive voltage on ionization chamber |
|---|---|
| 3½ | 90 |
| 4 | 120 |
| 4½ | 150 |
| 6 | 300 |

Meter 18 may suitably be a 20 micro-amp D.C. meter. The grounding resistor 120 should be about 20 megaohms, for the design shown, or at least in the range of about 10 to 20 megaohms.

While an electrometer tube is preferred, other vacuum tubes may be used. Even transistors may be used, although less sensitive and more easily damaged by radiation. And it will be understood that "control grid" includes a control connection to an amplification device, transistors and the like included.

It will be understood that the invention should not be limited to the embodiment illustrated in the drawings and described above, or to the specific illustrative values given. Persons skilled in the art will readily utilize the teachings of the invention for the construction of a large variety of similar radiation meters, with numerous and extensive departures from the particular embodiment, but without departure from the spirit or scope of the invention.

I claim:

1. A radiation sensing means which includes: a mounting ring of electrically insulating material, said mounting ring having opposite mounting surfaces on its opposite faces, and a central opening to provide a connection chamber; a metal ionization chamber having a mounting base attached to one of said mounting surfaces; a metal amplifier container having a mounting base attached to said mounting ring on a mounting surface opposite said ionization chamber mounting surface; an electrode mounted in an insulating bushing in the mounting base of said ionization chamber, and providing electrical communication between the interior of said ionization chamber and said connection chamber; amplification means within said amplifier container, including a control grid isolated electrically from said amplifier container; amplifier connection means mounted in a sealed bushing in said mounting base of said amplifier container and providing electrical communication between said control grid and said electrode in said connection chamber; a metal housing enclosing said mounting ring, said ionization chamber, and said amplifier container, and mounted on said mounting ring isolated electrically from said ionization chamber; and means for maintaining said ionization chamber at a potential positive with respect to said amplifier container and said housing.

2. A radiation sensing means which includes: a mounting ring of electrically insulating material, said mounting ring having opposite mounting surfaces on its opposite faces, and a central opening to provide a connection chamber; a metal ionization chamber having a mounting base attached to one of said mounting surfaces; a metal amplifier container having a mounting base attached to said mounting ring on a mounting surface opposite said ionization chamber mounting surface; gasket means of resilient electrically insulating material compressed between said mounting bases, and sealing said connection chamber; an electrode mounted in an insulating bushing in the mounting base of said ionization chamber, and providing electrical communication between the interior of said ionization chamber and said connection chamber; amplification means within said amplifier container, including a control grid isolated electrically from said amplifier container; amplifier connection means mounted in a sealed bushing in said mounting base of said amplifier container and providing electrical communication between said control grid and said electrode in said connection chamber; a metal housing enclosing said mounting ring, said ionization chamber, and said amplifier container, and mounted on said mounting ring isolated electrically from said ionization chamber; and means for maintaining said ionization chamber at a positive potential with respect to said amplifier container and said housing.

3. A radiation sensing means which includes: a mounting ring of electrically insulating material, said mounting ring having a central opening to provide a connection chamber; a metal ionization chamber mounted on said mounting ring and having a base at said connection chamber; a metal amplifier container mounted on said mounting ring and having a base at said connection chamber on the opposite side of said mounting ring from said ionization chamber; an electrode mounted in an insulating bushing in the base of said ionization chamber, and having an electrical contact portion projecting externally of said ionization chamber into said connection chamber; amplification means within said amplifier container, including a control grid isolated electrically from said amplifier container; amplifier connection means mounted in an insulating bushing in said base of said amplifier container and having an electrical contact portion projecting externally of said amplifier container into said connection chamber to make contact therein with said ionization chamber when said chamber and said container are brought into mounting position on said mounting ring; and means for maintaining said ionization chamber at a potential positive with respect to said amplifier container.

References Cited in the file of this patent

UNITED STATES PATENTS

| | | |
|---|---|---|
| 2,479,271 | Shonka | Aug. 16, 1949 |
| 2,481,964 | Wollan | Sept. 13, 1949 |
| 2,574,000 | Victoreen | Nov. 6, 1951 |
| 2,735,947 | Molloy | Feb. 21, 1956 |
| 2,756,347 | White | July 24, 1956 |
| 2,874,305 | Willson et al. | Feb. 17, 1959 |
| 2,874,306 | Kohman et al. | Feb. 17, 1959 |
| 2,916,626 | Thomas et al. | Dec. 8, 1959 |

FOREIGN PATENTS

| | | |
|---|---|---|
| 780,283 | Great Britain | July 31, 1957 |

OTHER REFERENCES

"Ionization of Gases by Neutrons," article by Bonner in the Physical Review, June 1, 1933, vol. 43, pp. 871 to 874.

UNITED STATES PATENT OFFICE
CERTIFICATE OF CORRECTION

Patent No. 2,995,661                                      August 8, 1961

Ralph E. White

It is hereby certified that error appears in the above numbered patent requiring correction and that the said Letters Patent should read as corrected below.

In the grant, lines 2 and 12, and in the heading to the printed specification, line 4, for "Nucleonics Corporation," each occurrence, read -- Riggs Nucleonics Corporation, --.

Signed and sealed this 20th day of April 1965.

(SEAL)
Attest:

ERNEST W. SWIDER                                  EDWARD J. BRENNER
Attesting Officer                                      Commissioner of Patents